United States Patent Office 3,535,072
Patented Oct. 20, 1970

3,535,072
DYEING PROCESS FOR POLYAMIDE FIBERS
Pierre Cordillot, Paris, France, assignor to Sandoz Ltd. (also known as Sandoz A.G.), Basel, Switzerland
No Drawing. Filed July 7, 1965, Ser. No. 470,229
Claims priority, application Switzerland, July 7, 1964, 8,911/64
Int. Cl. C09b 45/00; D06p 3/14
U.S. Cl. 8—54   3 Claims

ABSTRACT OF THE DISCLOSURE

Polyamide fibers are dyed with water-soluble dyes free from metallizable groups at a temperature of at least 95° C. and a pH above 5 in the dyeing medium containing at least 1 gram per liter of water-free soluble salt of a divalent metal.

---

The quality of the water used for dyeing is such an important factor that in the past dyeworks have been built on sites where a supply of water was available containing a minimum of dissolved salts, particularly those causing hardness, such as calcium and magnesium salts. In more recent times, with the progress of technology dyers have been able to install a purification and/or softening plant for water containing unduly high amounts of metallic impurities like iron and the salts that cause hardness. Information on the subject can be found in Ullmann, Enzyklopädie der technischen Chemie, vol. 7, p. 11–12 (1956).

It is also known that in the dyeing of natural polyamide fibers, e.g. wool, monovalent metal ions, such as those of sodium and potassium, in the form, for instance, of sodium chloride or sulfate, are capable of slowing down the build-up of acid dyes (cf. Kirk and Othmer Encyclopedia of Chemical Technology, vol. 5, p. 369 (1950)).

It has now been found that divalent metal ions in amounts greatly in excess of the degree of hardness considered tolerable in dyeing practice exercise no adverse influence in the dyeing of polyamide fibers at pH values above 5 and at temperatures above 95° C., and that in fact they promote the build-up properties of the water-soluble dyes used for these fibers.

The present invention therefore relates to a process for the dyeing of polyamide fibers with water-soluble dyes free from metallizable groups at a temperature of 95° C. or above, which process is characterized by dyeing in the presence of divalent metal ions in amounts of at least 1 gram of the water-free salt per liter of the dyeing medium and at a pH value above 5.

Examples of water-soluble dyes free from metallizable groups are reactive dyes containing a substituent cleavable as an anion and/or a C—C multiple linkage capable of addition, such as a di- or tri-halogeno-pyrimidyloxy- or -amino group, a mono- or di-halogeno-1,3,5-triazinyloxy- or -amino group, a dihalogenopyrimidyl-5-methylene-oxy- or -amino group, a dihalogenoquinoxaline-carbonylamino group, a low-molecular halogenoalkanoylamino, alkenoylamino or halogenoalkenoylamino group, a $\beta$-sulfatopropionylamino group, a vinylsulfonyl group or a $\beta$-sulfatoethylsulfonyl or $\beta$-sulfatoethylaminosulfonyl group. These reactive groups may either be bound directly to an aromatic nucleus of the dye molecule or indirectly through an aliphatic chain, e.g. —CH$_2$— or

—CH$_2$—CH$_2$—

Examples of dyes of this type are disclosed in the patents enumerated hereunder:

French Pat. 1,221,621, dihalogenopyrimidylamino group;
Belgian Pat. 573,301, dihalogenopyrimidyloxy group;
Belgian Pat. 578,742, French Pat. 1,225,281, Austrian Pat. 214,546, Swiss Pat. 361,066, trihalogenopyrimidylamino- or -oxy group;
Belgian Pat. 589,972, dihalogenopyrimidyl-5-methyleneamino group;
French Pats. 1,318,843; 1,319,429; 1,332,760; 1,334,122, dihalogenoquinoxalinecarbonylamino group;
Belgian Pats. 556,819; 559,944; 559,945; 560,734; 563,864; 560,791-795, 4-halogeno - 1,3,5-triazinyl - 2 - group substituted in the 6 position;
French Pats. 1,139,795-796; 1,143,176-177; 1,160,909; Belgian Pats. 556,819; 557,162; 558,390; 558,801; 558,816–817; 558,884; 558,957; 559,943; 560,105; 560,578; 560,839, 4,6 - dihalogeno - 1,3,5-triazinyl-2-group;
Belgian Pats. 565,279; 616,439; 576,104–105; French Pat. 1,203,580; U.S. Pat. 3,007,762, $\beta$-chloropropionylamino group;
Belgian Pats. 565,279; 565,447; 573,862; 582,944; 583,050; 596,925; 617,961; Swiss Pat. 365,814, acrylylamino group;
French Pats. 1,268,154; 1,268,684–685; German Pat. 1,124,171, $\beta$-sulfatopropionylamino group;
Belgian Pat. 609,696; French Pats. 1,343,185; 1,257,487, chloroacetylamino group;
French Pats. 1,222,194–195, chloroacetylaminomethylene group;
French Pats. 1,293,703; 1,300,463, $\alpha$-chloroacrylylaminomethylene group;
U.S. Pat. 2,657,205; French Pats. 1,323,145; 1,290,865; 1,264,826; 1,073,691; German Patent Application 1,159,900; German Pats. 886,139; 1,126,543, vinylsulfonyl or $\beta$-sulfato-ethylsulfonyl group;
French Pat. 1,256,707, $\beta$-sulfatoethylaminosulfonyl group.

Other water-soluble dyes free from metallizable groups are the so-called wool dyes, which belong to the monoazo, disazo, anthraquinone, phthalocyanine, triphenylmethane, 1:2 cobalt or 1:2 chromium complex series, and direct dyes possessing affinity for polyamide fibers. Dyes of these types are disclosed, e.g., in the following patents:

French Pats. 1,203,787; 1,105,735; 1,044,824; 1,038,959; 1,019,179; 921,988; 868,237; 908,338, metal-free dyes;
French Pats. 1,073,728; 1,100,320; 1,100,496; 1,102,177; 1,103,828; 1,107,888; 1,110,281; 1,134,742; 1,138,773; 1,210,546, 1:2 metal-complex dyes;
French additional pats. 64,596; 68,187.

The process of the present invention is suitable for the dyeing of natural polyamides (wool, animal hair) the synthetic polyamides of $\epsilon$-caprolactam, $\omega$-aminoundecylic acid, hexamethylene adipamide or sebacamide, and the copolymers of $\epsilon$-caprolactam and hexamethylene adipamide.

The most suitable divalent metal ions are the colorless ions of magnesium, calcium, strontium, barium, zinc, cadmium, and lead. Colored metal ions, such as those of copper, are less suitable. The metal ions are employed in the form of their water-soluble salts, e.g. the halides, nitrates, sulfates, or the substituted or unsubstituted low-molecular alkanoates (formate, acetate, propionate, butyrate, iso-butyrate, valerianate, lactate) or the substituted or unsubstituted benzoates (benzoate, methylbenzoate, halogenobenzoate). Especially interesting salts are the sulfates of magnesium and zinc, the acetates, formates and lactates of magnesium, zinc and calcium since these, unlike the chlorides, have little corrosive action on the metal parts of the dyeing equipment. However, when dyeing equipment with an inner enamel coating is used, the chlorides (CaCl$_2$, ZnCl$_2$) can be used equally as well as the sulfates, acetates, formates or lactates.

The presence of the small amounts of alkali metal sulfates commonly used for standardizing commercial dyes causes no interference. But due consideration must be given to the fact that when lead, strontium or barium ions are used, a certain percentage is apt to be precipitated in the form of insoluble sulfates, in which case the effectiveness of these ions is reduced.

Dyeing is carried out at a temperature of 95° C. to about 140° C., e.g. from 95° C. to the boil for wool and at temperatures above 100° C. with pressure, preferably at 120–130° C., for synthetic polyamide fibers.

An amount of the divalent metal ion is used sufficient to ensure good build-up of the dye on the fiber. Depending on the dye concentration of the medium and the liquor to goods ratio, the amount required may range from 1 to 100 grams of the salt per liter of the medium. For reactive dyes of low substantivity, like those of Belgian Pats. 573,299 and 578,742, an addition of 2–3 grams of salt per liter is sufficient for light shades of 0.5% depth dyed at a long liquor ratio (1:60); at a short liquor ratio (1:10) about 4–6 g./l. is necessary. The amount is increased, in proportion to the amount of dye, to 30 g./l. for liquor ratio 1:60 and 60 g./l. for liquor ratio 1:10 at a dye concentration of 4–5%. About 10–30 grams of salt per liter is used at medium liquor ratios (1:20–1:40) for dyeings of approximately standard depth (1–2%). For reactive dyes of higher substantivity which are suitable for the exhaustion dyeing of cotton, 1 to 3 grams of a salt of a divalent metal per liter of the dyebath is sufficient to obtain excellent results at liquor ratio 1:20 and dye concentrations of 0.5 to 3% (on the weight of the goods). For the acid and direct dyes the requisite amount of the salt of a divalent metal varies from about 2 to 30 grams per liter in relation to the depth of the dyeing.

A significant feature of the invention is that dyeing is carried out at a pH value above 5, e.g. in the pH region of 5 to about 11, or preferably 6 to 8, as measured at room temperature. When the dyebath has been set with a salt of acid reaction, e.g. ZnSO$_4$, a salt with buffering action is added to obtain a pH value in this region, e.g. sodium, potassium or ammonium acetate. The alkanoates require no addition of this kind. The dyebath may of course contain other dyeing assistants, such as levelling agents if required.

The dyeings obtained, especially those of reactive dyes, have good fastness to washing, milling, perspiration, dry cleaning and other wet treatments.

In the following examples the parts and percentages are by weight and the temperatures are given in degrees centigrade.

EXAMPLE 1

An autoclave is filled with 2500 parts of soft water. In this are dissolved at a temperature of 40° 0.5 part of an alkylpolyglycol etheroxyacetate having a $C_{16}$–$C_{18}$ alkyl chain and 20–30 etheroxy groups, 0.2 part of a condensation product of an alkylpolyethyleneimine having 2–5 ethylene-imine groups and a $C_{16}$–$C_{18}$ alkyl chain with 10–20 moles of ethylene oxide, and 5 parts of water-free sodium acetate. 100 parts of a polyamide fiber produced with hexamethylene adipamide are treated in the bath for 5 minutes at 40°, on which 1.5 parts of the dye sodium 1 - (2′,5′-dichlorophenyl)-3-methyl-4-(3″-trichloropyrimidylaminophenylazo) - 5-pyrazolone-4′,6′-disulfonate are added, followed by a 25% aqueous solution of 25 parts of zinc sulfate heptahydrate. After remaining at 40–50° for about 5 minutes the temperature is increased to 125° at the rate of 1° per minute. Dyeing is continued for 1 hour at 125°, then the bath is allowed to cool, and the dyed material rinsed at 60° and dried. A yellow dyeing fast to light and wet treatments is obtained.

A dyeing on the polyamide fiber made of ε-caprolactam shows the same good properties. Equally good results are obtained with the following dyes:

1-phenyl-3-methyl-4-(6″-trichloropyrimidylaminonaphthyl-2″-azo)-5-pyrazolone-2′,4′,4″,8″-tetrasulfonic acid, 1-phenyl-3-methyl-4-(6″-trichloropyrimidylaminonaphthyl 2″-azo)-5-pyrazolone-2′,4′,4″,8″-tetrasulfonic acid, 1-(3′-trichloropyrimidylaminophenylazo)-2-hydroxynaphthalene-6,8,6′-trisulfonic acid, 1-hydroxy-2-(3′-trichloropyrimidylaminophenylazo)-naphthalene-4,6,6′-trisulfonic acid, 1-hydroxy-2-phenylazo-8-trichloropyrimidylamino)-naphthalene-3,6,2′-trisulfonic acid or -3,5,4′-trisulfonic acid, the copper complex compounds of 1-hydroxy-2-(2′-hydroxy-phenylazo)-6-trichloropyrimidylaminonaphthalene-3,3′,5′-trisulfonic acid, of 1-hydroxy-2-(2′-hydroxy-3′-chlorophenylazo)-8-trichloropyrimidylaminonaphthalene-3,6,5′-trisulfonic acid, of 1-phenyl-3-methyl-4-(2″-hydroxy-3″-trichloropyrimidylaminophenylazo)-5-pyrazolone-2′,5′,5″-trisulfonic acid, of 1-hydroxy-2-(2′-hydroxyphenylazo)-6-trichloropyrimidylaminonaphthalene-3,3′,5′-trisulfonic acid or of 1-hydroxy-2-(2′-hydroxy-5′-trichloropyrimidylaminophenylazo)-8-aminonaphthalene-5,7,3′-trisulfonic acid, copper phthalocyanine-trisulfonic acid-sulfonic acid-(3′-trichloropyrimidylaminophenylamide), 1-amino-4-(4′-trichloropyrimidylaminophenylamino)-anthraquinone-2,3′-disulfonic acid 1-amino-4-(3′-trichloropyrimidylaminophenylamino)-anthraquinone-2,6,4′-trisulfonic acid, the 1:2-chromium complex compound of 1-hydroxy-2-(2′-hydroxy-5-chlorophenylazo)-8-trichloropyrimidylamino-naphthalene-3,6-disulfonic acid, the 1:2-chromium or 1:2-cobalt complex compound of 1-hydroxy-2-(2′-hydroxy-5′-nitrophenylazo)-8-trichloropyrimidylaminonaphthalene-3,6-disulfonic acid or of 1-(2′-hydroxy-5′-nitrophenylazo)-2-hydroxy-3-trichloropyrimidylaminonaphthalene-7,3′-disulfonic acid, 1-hydroxy-2-phenylazo-8-dichloropyrimidylaminonaphthalene-3,6,2′-trisulfonic acid, 1-hydroxy-2-phenylazo-8-(3″-trichloropyrimidylaminobenzoylamino)-naphthalene-3,6,2′,4′-tetrasulfonic acid, 1-hydroxy-2-[3′-(4″-chloro-6″-phenylamino-1″,3″,5″-triazinyl-2″-amino)-phenylazo]-8-benzoylaminonaphthalene-3,6,6′,4‴-tetrasulfonic acid, 4-(4″-chloroacetylamino-2″-methylphenylazo)-4′-1‴-hydroxynaphthyl-2‴-azo)-3,3′-dimethyl-1,1′-diphenyl-6,6′,4‴-trisulfonic acid, 1-hydroxy-2-phenylazo-8-(4″,6″-dichloro-1″,3″,5″-triazinyl-2″-amino)-naphthalene-3,6,2′-trisulfonic acid, 1-hydroxy-2-phenylazo-6-(4″,6″-dichloro-1″,3″,5″-triazinyl-2″-amino)-naphthalene-3,2′-disulfonic acid, 2-[4′-(4″,6″-dichloro-1″,3″,5″-triazinyl-2″-amino)-2′-methylphenylazo]-naphthalene-4,8-disulfonic acid, 1-amino-4-(4′-chloroacetylaminophenylamino)-anthraquinone-2-sulfonic acid. These dyes are applied in the form of their alkali metal salts or ammonium salts.

EXAMPLE 2

The dyeing procedure is as given in the preceding example and the dyebath is set with 25 parts of water-free calcium formate and 1.5 parts of the dye sodium 2-(4′-trichloropyrimidylamino-2′-methylphenylazo) - naphthalene-4,6,8-trisulfonate but without an addition of sodium acetate, since the calcium formate in solution already has a pH value of 6.5–7.0. A reddish yellow dyeing is obtained which has very good light and wet fastness.

The calcium formate can be replaced by an equivalent amount of calcium acetate dihydrate or calcium lactate pentahydrate.

Equally good results are obtained with the following dyes:

1-amino-4-(2'-methoxy-5'-sulfatoethylsulfonylphenylamino)-anthraquinone-2-sulfonic acid,
1-amino-4-(3'-sulfatoethylsulfonylphenylamino)anthraquinone-2-sulfonic acid,
1-phenyl-3-methyl-4-[4''-(4'''-chloro-6'''-phenylamino-1''',3''',5'''-triazinyl-2'''-amino)-phenylazo]-5-pyrazolone-3',2''-disulfonic acid,
4-(4''-trichloro-pyrimidyloxyphenylazo)-4'-(1'''-hydronaphthyl-2'''-azo)-5,5'-dimethyl-1,1'-diphenyl-2,2',4'''-trisulfonic acid,
1-(4'-p. tert. amylphenoxyphenylazo)-2-(2'',4'',6''-trimethylphenylamino)-8-hydroxynaphthalene-6,2'-disulfonic acid,
4-(2''-amino-8''-hydroxynaphthyl-1''-azo)-2,2'-dimethyl-4'-dodecyloxycarbonylamino-1,1'-diphenyl-5,6''-disulfonic acid,
1-benzoyl-2-hydroxy-4-(4'-tert-amylphenoxy)-6-(4'-methylphenylamino-3-azabenzanthrone-2',2''-disulfonic acid,
1-amino-2-(4'-nonylphenoxy)-4-(2'',6''-dimethylphenylamino)-anthraquinone-2',4''-disulfonic acid,
6,7-dichloro-1,4-di-(2',4',6'-trimethylphenylamino)-anthraquinone-disulfonic acid,
6,7-dichloro-1,4-di-(5',6',7',8'-tetrahydronaphthyl-2'-amino)-anthraquinone-disulfonic acid,
1,4-di-(2',4',6'-trimethylphenylamino)-anthraquinone-disulfonic acid,
1,4-di-(2',4',6'-trimethyl-3'-bromophenylamino)-anthraquinone-disulfonic acid,
1-amino-4-(2',4',6'-trimethyl-3'-α-chloroacrylylaminomethylphenylamino)-anthraquinone-2-sulfonic acid,
1-amino-4-(2',4',6'-trimethyl-3'-chloroacetylaminomethylphenylamino)-anthraquinone-2-sulfonic acid,
1-(2'-chloro-6'-methylphenyl)-3-methyl-4-(2''-methoxy-5''-sulfatoethylsulfonylphenylazo)-5-pyrazolone-4'-sulfonic acid,
1-hydroxy-2-(2'-methoxy-5'-sulfatoethylsulfonylphenylazo)-naphthalene-5-sulfonic acid,
1-hydroxy-2-phenylazo-8-(4''-chloro-6''amino-1'',3'',5''triazinyl-2''amino)-naphthalene-3,6,2'-trisulfonic acid,
1-hydroxy-2-(4'-acetylaminophenylazo)-6-(4''-chloro-6''-phenylamino-1'',3'',5''-triazinyl-2''-amino)-naphthalene-3,2',3'''-trisulfonic acid,
1-amino-4-[3'-(4''-chloro-6''-phenylamino-1'',3'',5''-triazinyl-2''-amino)-phenylamino]-anthraquinone-2,4',4'''-trisulfonic acid,
1-[4'-methyl-2'-(β-sulfatoethylaminosulfonyl)-phenyl]-3-methyl-4-[4''-methyl-2''-(β-sulfatoethylaminosulfonyl)-phenylazo]-5-pyrazolone,
copper phthalocyanine trisulfonic acid-tri-(N-methyl-N-β-sulfato-ethylamino-propylamide),
1-(2'-methylphenyl)-3-methyl-4-(3'''-chloroacetylaminophenylazo)-5-pyrazolone-4',6''-disulfonic acid,
2-[4'-(4''-trichloropyrimidylamino-2''-methylphenylazo)-2'-methylphenylazo]-naphthalene-4,6,8-trisulfonic acid,
1-hydroxy-2-(3'-trichloropyrimidylaminophenylazo)-naphthalene-4,6,6'-trisulfonic acid,
1-hydroxy-2-phenylazo-8-trichloropyrimidylaminonaphthalene-3,5,2'-trisulfonic acid,
1-amino-4-(3'-trichloropyrimidylaminophenylamino)-anthraquinone-2,4',6'-trisulfonic acid,
4-(1'''-hydroxynaphthyl-2''-azo)-2,2'-dimethyl-4'-(p-phenylsulfonyloxyphenylazo)-1,1'-diphenyl-3'',6''-disulfonic acid, and the condensation product of 1 mole fumaric acid dichloride and 2 moles 1-amino-3-methyl-4-(4'-phenylazophenylazo)-benzene-2',4''-disulfonic acid. The afore-mentioned dyes are applied in the form of their sodium, potassium or ammonium salts.

EXAMPLE 3

0.6 part of stearyleicosaglycol etheroxyacetate and 0.15 part of the condensation product of 1 mole of stearyl tri-(ethyleneimine) and 15 moles of ethylene oxide are dissolved in 3000 parts of soft water at 40°. 100 parts of wool are entered into this bath and left in it for 5 minutes at 40°. Then 2 parts of the dye sodium 1,4-di - (2',4',6'-tri-methylphenylamino) - anthraquinone-disulfonate (Textil-Rundschau 8, 3, (1953)) are added in the form of an aqueous solution, together with 30 parts of calcium acetate dihydrate in form of a neutral 10% solution. The bath is stirred for a few minutes at 40–45°, then it is brought to 100° in about 1 hour and held for 1 hour at the boil. On cooling to 60° the wool is removed, rinsed with water at 60° and dyed. The blue dyeing obtained has very good light fastness and good wet fastness.

This dyeing procedure gives equally good results with the dyes enumerated in Examples 1 and 2.

When the calcium acetate dihydrate used in this example is replaced by nickel acetate tetrahydrate, a comparably bright, fast-to-light dyeing is obtained. This is also the case when the blue dye sodium 1-amino-4-(4'-trichloropyrimidylamino-phenylamino) - anthraquinone-2,3'-disulfonate is used. Dyeings of duller shade but similarly of good light fastness are obtained with the blue dye sodium 1-amino-4-(3'-trichloropyrimidylamino-phenylamino)-anthraquinone-2,4',6'-trisulfonate and the red dye sodium 1-hydroxy-2-phenylazo-8-(3''-trichloropyrimidylaminobenzoylamino) - naphthalene-3,6,2',4'-tetrasulfonate.

EXAMPLE 4

4000 parts of soft water are run into a dye autoclave. 100 parts of a polyamide fiber made with hexamethylene adipamide are entered and left in the water for 5 minutes at 40–50°, then 1.5 parts of the dye sodium 2[4'-(4'' - trichloropyrimidylaminophenylazo) - phenylazo] naphthalene-4,6,8-trisulfonate in aqueous solution are added, together with 8 parts of water-free calcium formate in the form of a 15% aqueous solution. The dyebath is raised to 125° in about 1 hour and dyeing continued for one hour at this temperature. An orange dyeing is obtained which is equal in depth and as fast to light as a dyeing produced in a bath at pH 3 containing formic acid, and it has better fastness to washing at 95° than the latter dyeing.

The amount of calcium formate can be increased from 2 to 15 grams per liter, i.e. 60 parts, in which case a dyeing of yet greater depth is obtained, with still better fastness to washing at 95°.

EXAMPLE 5

100 parts of a polyamide fiber produced with hexamethylene adipamide are treated for 5 minutes at 40–50° in 2000 parts of soft water in an autoclave. Then 2 parts of the dye used in Example 3 are added, together with 3.6 parts of 25% ammonia, on which the pH valve increases to about 11. A concentrated aqueous solution of 30 parts of water-free calcium formate is added, the temperature of the bath increased to 125° in about 1 hour and this temperature maintained for a further 1 hour. A blue dyeing is obtained which is of the same depth as one produced in the presence of formic acid and has equally good light and washing fastness.

Good results are also obtained with lead acetate trihydrate, nickel sulfate hexahydrate, strontium nitrate tetrahydrate or water-free barium nitrate.

Having thus disclosed the invention, what I claim is:
1. In the exhaustion dyeing of polyamide fibers with a water-soluble dye free from metallizable groupings in an aqueous dyeing medium, the improvement wherein the dyeing is effected in a medium which (a) has a temperature of 95° C. to 140° C., (b) has a pH between 5 and 11 and (c) contains dissolved therein colorless divalent metal ions selected from the group consisting of magnesium, calcium, strontium, barium, zinc, cadmium and lead in an amount of from 0.3 to 4.6 grams of metal per liter of said dyeing medium.

2. A process according to claim 1 wherein the dyeing medium has a pH value between 6 and 8 and the metal ion is selected from the group consisting of calcium, magnesium and zinc in dissolved form.

3. A process according to claim 2 wherein the polyamide fibers are synthetic polyamide fibers.

References Cited
UNITED STATES PATENTS

| | | | |
|---|---|---|---|
| 2,987,368 | 6/1961 | Bene | 8—166 |
| 3,075,821 | 1/1963 | Goldemberg et al. | 8—54 |
| 3,352,755 | 11/1967 | Lerner et al. | 8—82 |
| 3,447,890 | 6/1969 | Harding | 8—54 |

OTHER REFERENCES

Diserens, Chem. Tech. Dyeing & Printing, vol. II, 1951, pp. 323, 324.

Trotman, Dyeing & Chem. Tech. of Textile Fibers, 1964, pp. 346–47.

NORMAN G. TORCHIN, Primary Examiner

J. E. CALLAGHAN, Assistant Examiner

U.S. Cl. X.R.

8—166